US011397159B1

(12) United States Patent
Shapiro et al.

(10) Patent No.: US 11,397,159 B1
(45) Date of Patent: Jul. 26, 2022

(54) SYSTEMS, DEVICES AND METHODS FOR ANALYZING CONSTITUENTS OF A MATERIAL UNDER TEST

(71) Applicant: BYTE NUTRITION SCIENCE INCORPORATED, Ottawa (CA)

(72) Inventors: Daniel Shapiro, Ottawa (CA); Brian Dressler, Ottawa (CA); Ryan Wallace, Ottawa (CA); Hershel Caytak, Ottawa (CA)

(73) Assignee: BYTE NUTRITION SCIENCE INCORPORATED, Ottawa (CA)

( * ) Notice: Subject to any disclaimer, the term of this patent is extended or adjusted under 35 U.S.C. 154(b) by 338 days.

(21) Appl. No.: 16/559,141

(22) Filed: Sep. 3, 2019

Related U.S. Application Data

(60) Provisional application No. 62/725,861, filed on Aug. 31, 2018.

(51) Int. Cl.
G01N 27/02 (2006.01)
G06N 3/04 (2006.01)
G06N 3/08 (2006.01)

(52) U.S. Cl.
CPC ............. G01N 27/026 (2013.01); G06N 3/04 (2013.01); G06N 3/08 (2013.01)

(58) Field of Classification Search
USPC .......................................................... 702/65
See application file for complete search history.

(56) References Cited

U.S. PATENT DOCUMENTS

| 3,218,552 | A | 11/1965 | Asmann et al. |
| 3,665,302 | A | 5/1972 | Lees et al. |
| 3,966,973 | A | 6/1976 | Henry et al. |
| 4,226,540 | A | 10/1980 | Barten et al. |
| 4,279,346 | A | 7/1981 | McClure et al. |
| 4,384,476 | A | 5/1983 | Black et al. |
| 5,039,947 | A | 8/1991 | Kraszewski et al. |
| 5,189,366 | A | 2/1993 | Mayo |
| 5,218,309 | A | 6/1993 | Nelson et al. |
| 5,822,068 | A | 10/1998 | Beaudry et al. |
| 6,204,670 | B1 | 3/2001 | Joshi |
| 6,435,002 | B1 | 8/2002 | Briggs |
| 6,786,096 | B2 | 9/2004 | Bond et al. |
| 6,870,376 | B1 | 3/2005 | Gensler |
| 2002/0120435 | A1* | 8/2002 | Frazier .................. G06N 3/105 704/1 |

(Continued)

FOREIGN PATENT DOCUMENTS

| DE | 19843095 A1 | 3/2000 |
| EP | 0803728 A1 | 10/1997 |
| EP | 0971227 A1 | 1/2000 |
| EP | 3086118 A1 | 10/2016 |

(Continued)

Primary Examiner — Paul D Lee

(57) ABSTRACT

A method for analyzing constituents of a material under test is disclosed. The method includes obtaining a plurality of impedance spectroscopy measurements of the material under test over a predetermined frequency range. A data set is passed to a machine learning system, the machine learning system having been trained to return an output related to one or more constituents in the material under test based on impedance spectroscopy measurement data over the predetermined frequency range. An output of the machine learning system is received and outputted. Related systems, methods and devices are also disclosed.

19 Claims, 8 Drawing Sheets

(56) References Cited

U.S. PATENT DOCUMENTS

| | | |
|---|---|---|
| 2003/0098409 A1 | 5/2003 | Bond et al. |
| 2004/0130714 A1 | 7/2004 | Gellerman et al. |
| 2006/0188616 A1 | 8/2006 | Pierce et al. |
| 2007/0241756 A1 | 10/2007 | Mizukami et al. |
| 2010/0086655 A1 | 4/2010 | Singer |
| 2012/0321759 A1 | 12/2012 | Marinkovich et al. |
| 2013/0015354 A1 | 1/2013 | Diamond |
| 2013/0027060 A1 | 1/2013 | Tralshawala et al. |
| 2014/0041532 A1 | 2/2014 | Minvielle |
| 2015/0164387 A1* | 6/2015 | Varsavsky ......... A61B 5/14865 702/182 |
| 2015/0168365 A1 | 6/2015 | Connor |
| 2016/0140870 A1 | 5/2016 | Connor |
| 2016/0313260 A1 | 10/2016 | Meaney et al. |
| 2019/0076070 A1* | 3/2019 | Nogueira ............... G16H 20/17 |

FOREIGN PATENT DOCUMENTS

| | | |
|---|---|---|
| FR | 2651325 A1 | 3/1991 |
| FR | 2876186 A1 | 4/2006 |
| FR | 2922022 A1 | 4/2009 |
| FR | 2935048 A1 | 2/2010 |
| FR | 3006448 A1 | 12/2014 |
| JP | 2007040918 A | 2/2007 |
| WO | 2000020852 A1 | 4/2000 |
| WO | 2005116634 A1 | 12/2005 |
| WO | 2007108906 A2 | 9/2007 |
| WO | 2008147988 A1 | 12/2008 |
| WO | 2009063497 A2 | 5/2009 |
| WO | 2011080371 A9 | 8/2011 |
| WO | 2012088818 A1 | 7/2012 |
| WO | 2014017940 A1 | 1/2014 |
| WO | 2015107455 A1 | 7/2015 |
| WO | 2016087719 A1 | 6/2016 |

\* cited by examiner

SYSTEMS, DEVICES AND METHODS FOR ANALYZING CONSTITUENTS OF A MATERIAL UNDER TEST

RELATED APPLICATIONS

This application claims priority to U.S. Provisional Application No. 62/725,861 filed on Aug. 31, 2018, which is all incorporated herein by reference in its entirety.

FIELD

Embodiments of the present disclosure relate to systems, devices and methods for analyzing constituents of a material under test. In particular, embodiments of the present disclosure relate to systems, devices and methods for non-invasively analyzing constituents of a material under test using impedance spectroscopy measurements and a machine learning system.

BACKGROUND

A wide variety of methods for analyzing a material to determine its constituents and attributes of its constituents are known. Within these analytical methods, non-invasive techniques allow one to analyze the material in a non-destructive manner so that the material is not damaged in the process of determining its constituents or attributes of its constituents. Such non-invasive measurement paradigms include optical, ultrasonic, radiofrequency, functional near-infrared, microwave and organic sensor technologies.

Non-invasive analytical techniques may be particularly desirable where the material being analyzed is to be preserved or is to remain substantially unaltered. For example, it may be desirable to use non-invasive techniques on foodstuffs, such as vegetables and fruits intended for sale, or precursors in industrial food production, or analysis of bodily fluids such as blood or urine.

BRIEF DESCRIPTION OF THE DRAWINGS

In the following figures, dimensions of components are chosen for convenience and clarity only and are not necessarily shown to scale. Embodiments of the present disclosure will now be described in greater detail with reference to the accompanying figures, in which.

DETAILED DESCRIPTION

Figure 1:
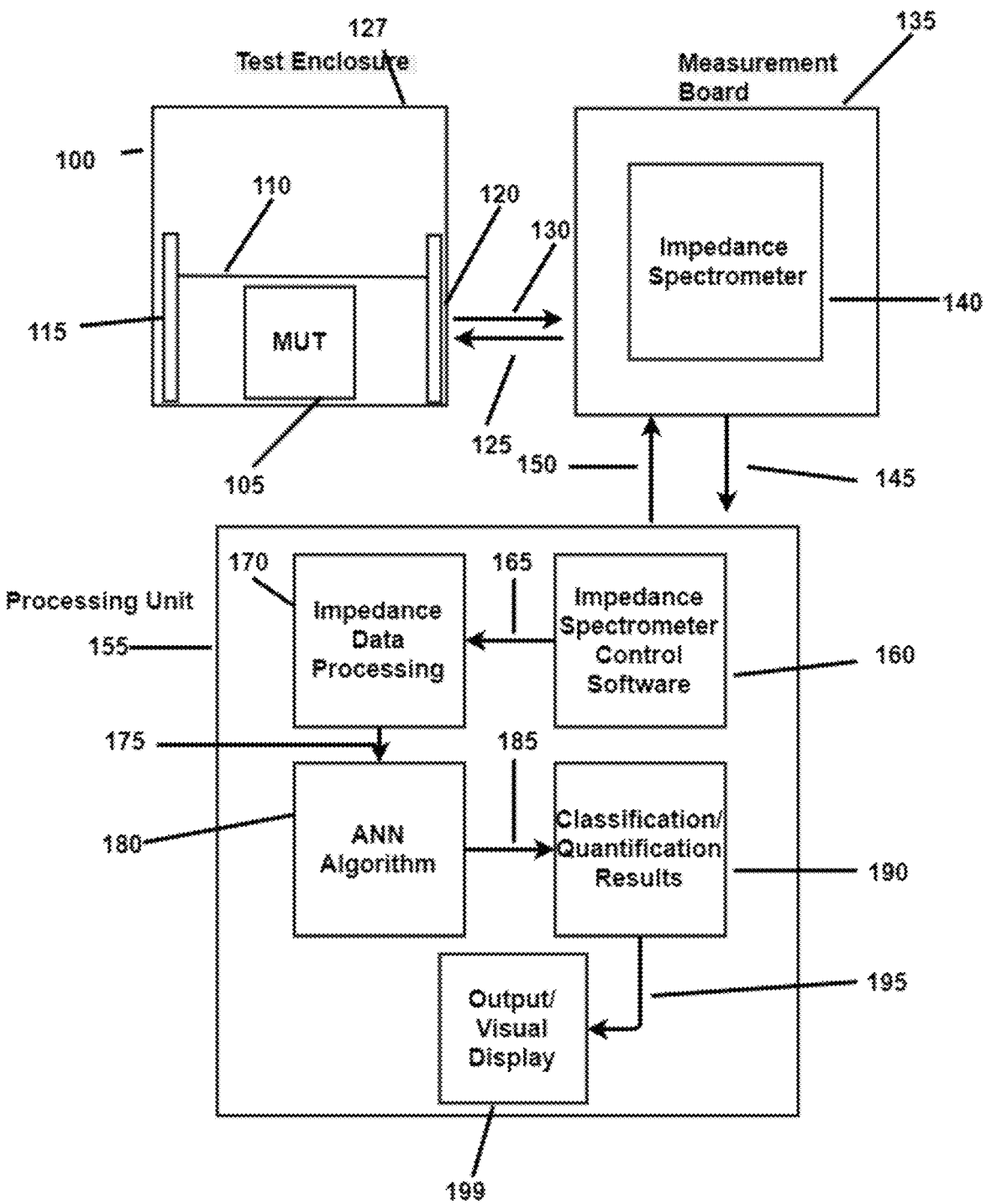
FIG. 1 is a functional system overview of one embodiment according to the present disclosure.

As a general non-invasive measurement method, impedance spectroscopy may be advantageous. Impedance spectroscopy can be used to characterize biological material which have both resistor and capacitive like properties. For example, food stuffs, such as fruits and vegetables, have a relatively simple structure in terms of passive electrical response to injected current or voltage. For example, cells are surrounded by insulating membranes which are analogous to capacitors; the cytosol and extracellular fluids are electrolytes which display ohmic like behaviour up to hundreds of MHz. These electrical properties are modelled as physical circuits or mathematical models which are used to extract features of the raw data; further analysis can be used for characterization of the produce (deriving relationships between impedance data and specific characteristics such as changes to physical or physiological functions).

Although impedance analysis may be useful in determining parameters related to a food stuff, there are some significant limitations to this method as described by the current state of the art. In known methods it may be difficult to relate impedance data characteristics due to a non-linear relationship between the parameters of interest and electrical properties. In other cases the signal may be difficult to analyze due to an overlapping effect of other factors unrelated to the parameters of interest.

In addition, in known methods, it may be difficult to a priori set the parameters of the measurement (i.e. current amplitude, frequency range, electrode size) since it is unclear for which measurement configuration the best signal of the parameter of interest can be achieved.

In known methods, it may also be difficult to interpret the raw impedance measurements since there are many data points which may present redundant information. In addition, the desired features of the data set are generally unknown, thus requiring a laborious case by case trial and error approach of selecting the appropriate processing and modeling methods for data interpretation.

According to the present disclosure, machine learning, in particular the use of artificial neural networks (ANN), may be used in applications where no clear linear relationship can be determined between measurement data and a parameter of interest. According to the present disclosure, a machine learning system, such as an ANN is comprised of multiple nodes which are representative of biological neurons in a human brain. The ANNs is configured to process in a manner similar to the way the human brain processes information. Logically, the ANN is formed from nodes referred to as artificial neurons or processing elements (PE); the nodes are organized in an input layer, a hidden layer or layers, and an output layer. Each node in the ANN consists of a set of input values ($X_i$), associated weights ($W_i$) and a transfer function ($G_i$) that adds the weights and maps them onto an output ($Y_i$) which is an input to a subsequent node. The weighed sum of the inputs then constitutes the activation of the node which then passes on an output value determined by the transfer function. In a supervised learning mode (i.e. training mode), discussed in more detail below, the outputs of the data are known. It is then possible to calculate the error between the values calculated by the ANN and the correct values. The error is described in terms of a "cost function", the weights are then adjusted—for example by some derivative of the transfer function— and the output is recalculated. This process is continued iteratively until the solution converges or reaches a desired accuracy.

In some embodiments, the ANN is a convolutional neural network (CNN). Specifically, in some embodiments the ANN is a one-dimensional CNN, which has been determined to provide acceptable error rates on impedance spectroscopy data sets. The CNN applies a convolution filter as the data passes through the neuron layers.

FIG. 1 is a functional diagram displaying the components of one embodiment of a system according to the present disclosure. Included is a test enclosure for the material under test (MUT), a measurement board with impedance spectrometry functionality for non-invasive measurements of the MUT and a processing unit which includes: control software for the impedance spectrometer, output of impedance data, input of impedance data into a machine learning system (MLS), such as an ANN/CNN, classification results of the MLS and an output/visual display of the results.

Specifically, the test enclosure 100 contains the MUT shown as a block 105 immersed in an aqueous solution 110. Electrodes 115 and 120 are shown placed against opposing sides of the test enclosure. The electrodes may consist of metal plates which have high anti-corrosive properties such as stainless steel. In the embodiment shown, the MUT is a solid or semi-solid item that is immersed in the solution 110. For example, the MUT 105 may be a food stuff and can consist of any fruit, vegetable or processed or unprocessed food that will not be damaged by immersion in the aqueous solution 110. The aqueous solution 110 is provided with an electrically conductive medium.

In some embodiments, the MUT 105 may itself not require immersion in the aqueous solution 110 and may have the electrodes 115 and 120 inserted directly into the MUT. For example, the MUT may be a suspension or emulsion of food stuffs or may be a consumable liquid such as a beverage. For example, the MUT may be an alcoholic beverage, such as beer, wine, or spirits, or a non-alcoholic beverage such as juice.

In some embodiments, the MUT may also be a different, non-food substance, such as a chemical composition, organic compound or biological sample. For example, in some embodiments the MUT may be blood, such as human blood.

In the case of a MUT requiring an aqueous solution 110, the MUT may be rinsed prior to immersion and measurement to remove dirt and other impurities that may have adhered to the MUT.

The hardware of the measurement board 135, more specifically the impedance spectrometer 140, is shown connected to the test enclosure 100 through links 125 and 130. The probe current is passed from the impedance spectrometer 140 to the test enclosure 100 through link 125, for example, representing a lead wire connected to an electrode. The current then is passed through the solution 110 and the MUT 105 and returned to the impedance spectrometer 140. The voltage drop across the electrodes 115 and 120 is measured by the impedance spectrometer 140 and is used to calculate the impedance spectrum of the MUT 105 and the aqueous solution 110.

In embodiments where the MUT does not require the aqueous solution 110, such as in the case when the MUT is a consumable liquid, it will be understood that the voltage drop across the MUT itself is measured and is used to calculate the impedance spectrum of the MUT.

A processing unit 155 is used to control the measurement board 135 and the impedance spectrometer 140. Specifically, in the embodiment shown, the impedance spectrometer control software 160 is used for programming and setting the measurement parameters of the impedance spectrometer 140 through communication link 150. After the measurement process described in the previous paragraph, impedance spectrum data is passed through link 145 to the impedance spectrometer control software 160 in the processing unit 155. The data is then passed through link 165 into the module impedance data 170. The data is processed in 170 so as to be readable as inputs into an MLS, such as an artificial neural network (ANN) algorithm 180. Processing steps may include scaling, nominalizing and filtering out data outliers. Following this step, the processed data is then sent through link 175 to the ANN 180 for classification or quantification of the MUT, the ANN 180 then providing an output.

The output, e.g. the classification or quantification results, are passed through link 185 to the classification or quantification output 190, which is in turn sent through 195 to an output/visual display 199 where it is outputted in a manner intelligible to a user.

Figure 2:
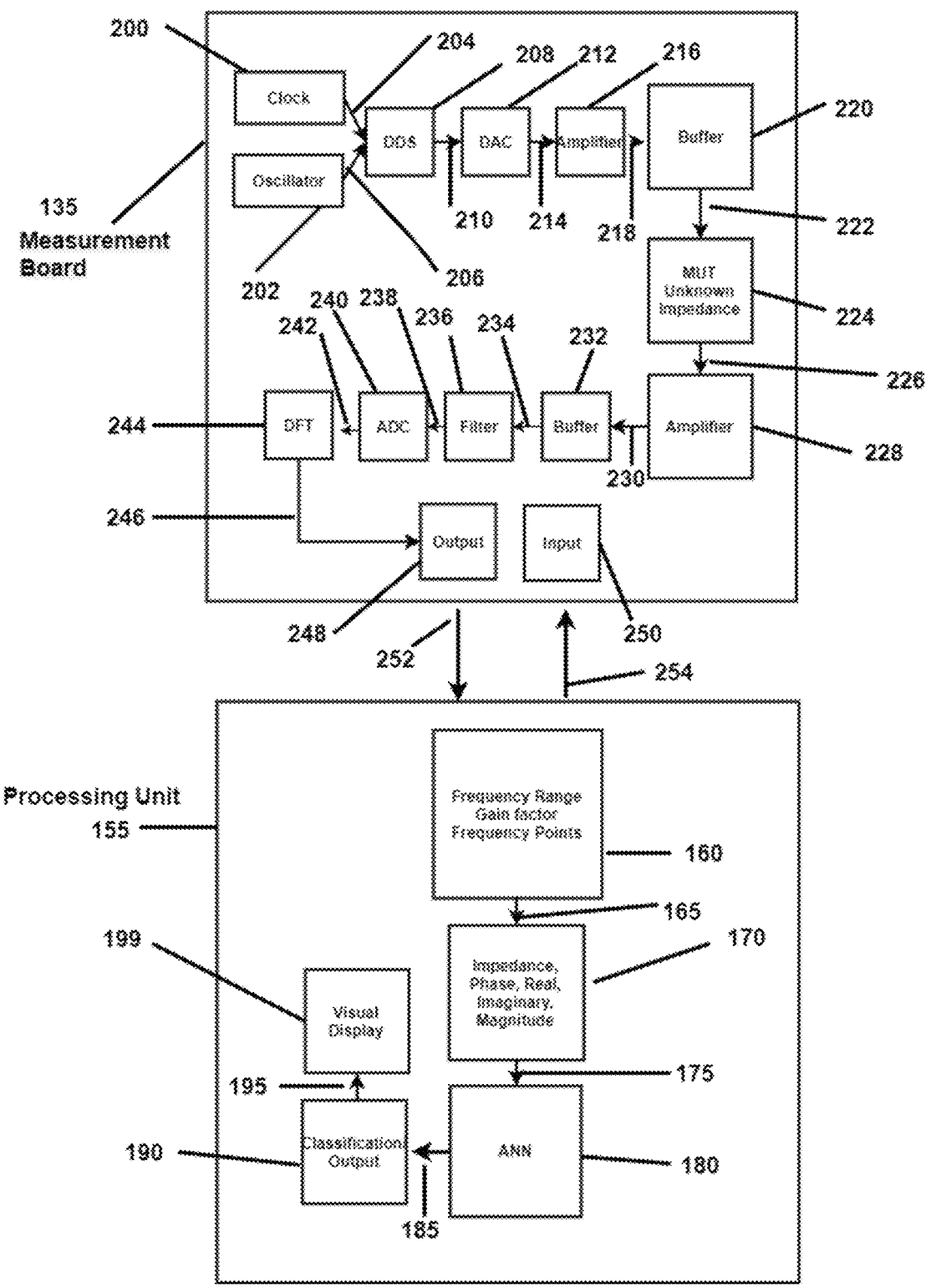
FIG. 2 is a detailed system overview of one embodiment according to the present disclosure.

FIG. 2 provides a detailed overview of the above-described embodiment including the components of the measurement board 135 and the processing unit 155.

Parameters of the frequency sweep measurement are set in the impedance spectrometer control software 160. These parameters may include the frequency range, gain factor for calibrated measurements, number of frequency points and intervals between measurement frequencies. These parameters are sent through link 254 into the input 250 of the measurement board 135.

The frequency of the probe current is set by an oscillator 202, which, for example, may be comprised of an amplifier connected in a feedback loop and electronic filter (this is known as feedback oscillator circuit) or a piezoelectric crystal.

The oscillator 202 is synchronized with cycles of the clock 200 through links 206 and 204 respectively. The frequency of the oscillator 202 is then fed into a direct digital synthesizer (DDS) 208 which outputs a digital waveform at a programmed frequency or set of frequencies based on the reference frequency of the oscillator. The waveform is fed through link 210 into the digital to analog converter (DAC) 212 for conversion into an analog signal which is passed via link 214 into an amplifier 216 and then through 218 into a buffer 220. The buffer 220 may serve the purpose of preventing excessive current draw from the measurement board into the MUT 105.

The measurement waveform is then passed between measurement leads 222 and 226 to the electrodes 115 and 120 and through the MUT 224/105 which is of unknown impedance. On the return path the waveform is amplified in amplifier 228, passed through 230 into a further buffer 232 and optionally further passed through 234 into a filter 236 for removal of unwanted noise and other artifacts.

The filtered signal is passed through 238 into an analog to digital converter (ADC) 240 for conversion back into a digital signal. The signal is passed through 242 for conversion into the frequency domain using the discrete fourier transform (GFT) 244. After this stage, the real and imaginary components of the signal (resistance and reactance) are passed through 246 into the output of the board 248. The measured impedance is then transmitted via 252 into the processing unit 155, more specifically into the impedance spectrometer control software 160.

The impedance data is then passed through 165 into 170, data can include all components of impedance, including magnitude, phase, real (resistance), and imaginary (reactance). In addition impedance data may be calibrated to a known circuit or may be uncalibrated. The impedance is processed in 170 to be readable in the MLS, such as the ANN 180, and is then passed through 175 as an input into the ANN 180. The results of the ANN 180 classification are outputted through 185 into 190. Results are then passed through 195 into 199 which represents a format which is readable by a human operator such as a visual display.

In some example embodiments, the frequency range may be about 1-100 kHz with 10 Hz increments. In some embodiments, the frequency range may be about 20-100 kHz with 10 Hz increments.

Figure 7:
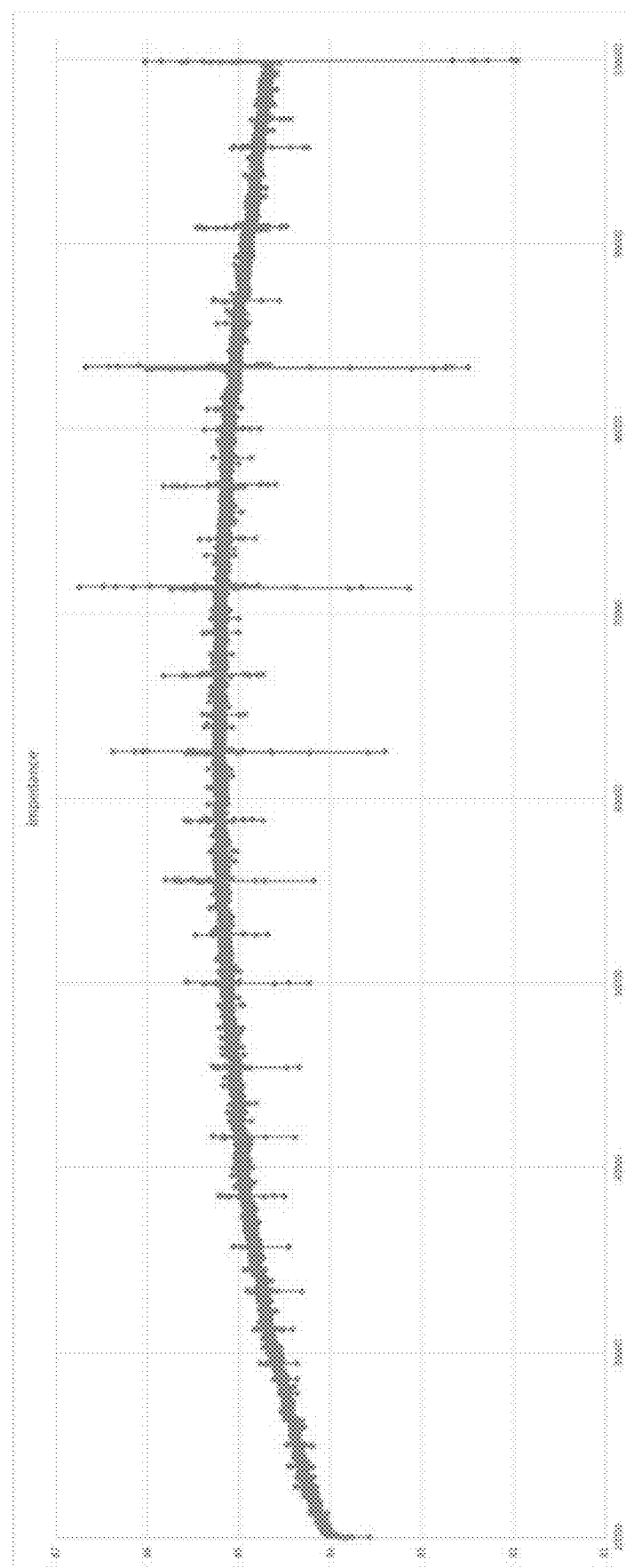
FIG. 7 shows an example impedance sweep of saltwater.

FIG. 7 shows an example impedance sweep of saltwater (8000 points, 10 Hz increments with a range of 20-100 kHz). As can be seen, there are multiple resonance points within the impedance sweep due to the presence of the salt in the water.

Figure 8:
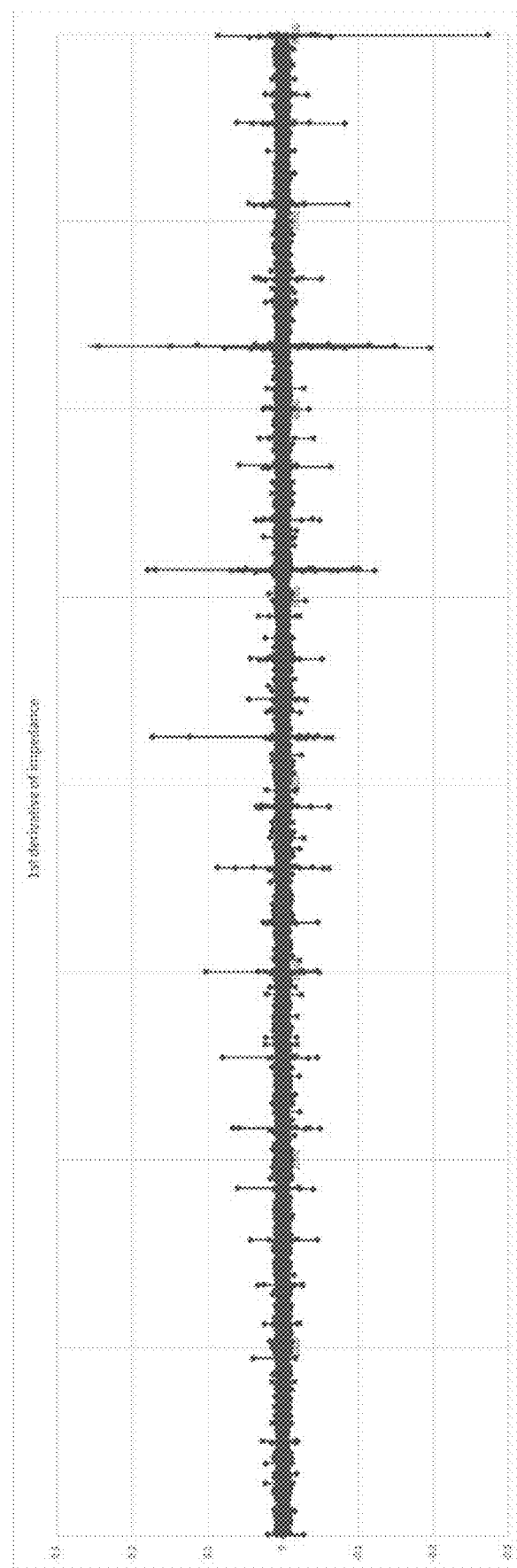
FIG. 8 shows a chart of the first derivative of the sweep in FIG. 7.

FIG. 8 shows a graph of the first derivative of the sweep in FIG. 7, which further brings out the detail of the resonance data.

Figure 3:
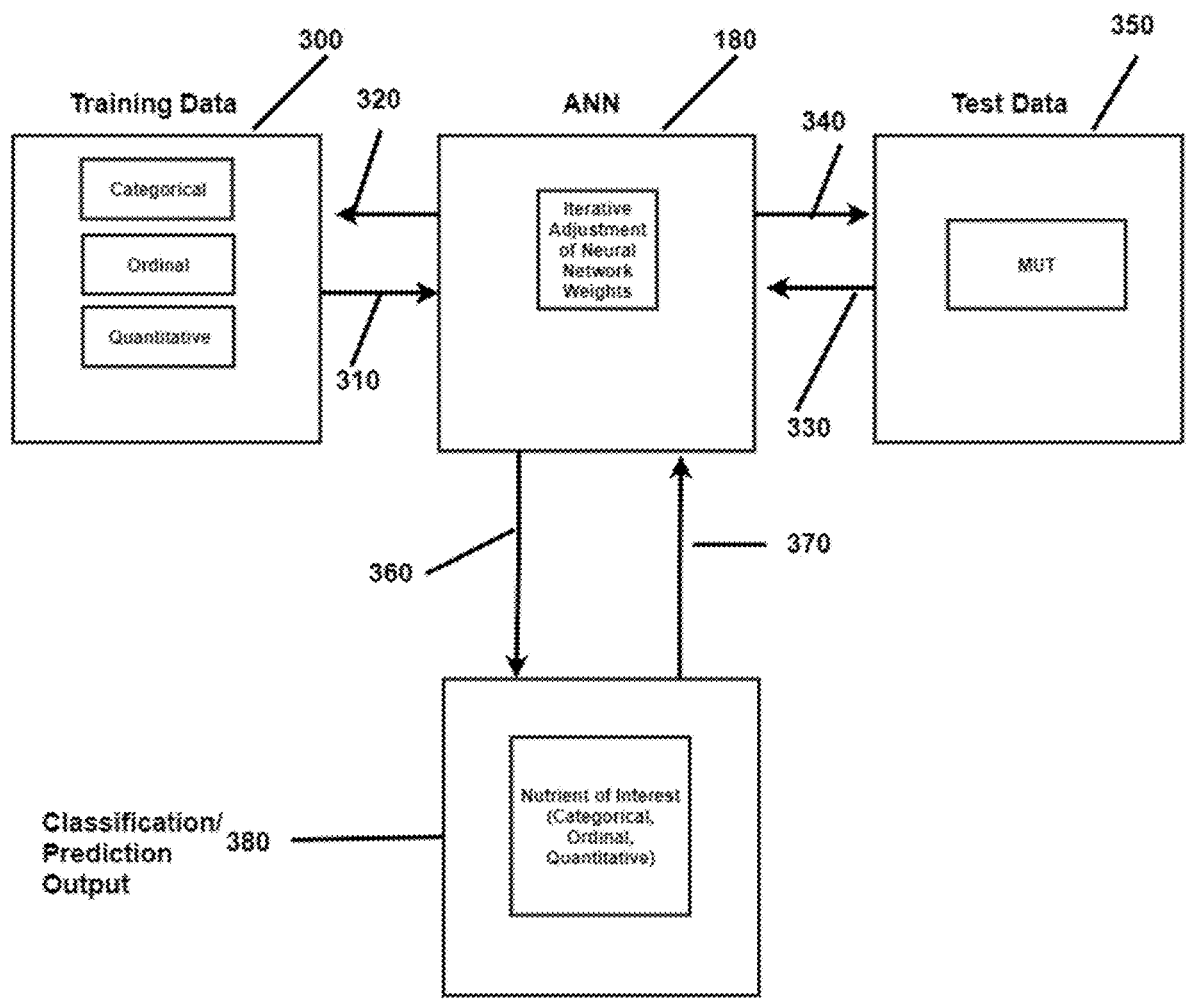
FIG. 3 shows an example classification process according to one embodiment according to the present disclosure.

FIG. 3 illustrates in greater detail an embodiment of the classification and prediction process of the MLS, such as the ANN 180. Specifically, in the above described embodiments an MUT is analyzed through feeding impedance spectroscopy data through the MLS in order to analyze the MUT and determine outputs related to one more constituents in the MUT, such as information about constituents or attributes of constituents of the MUT, e.g. classification or quantification. To do so, the MLS must be initially trained in a training phase to provide accurate output.

In one embodiment of the present disclosure; the MLS is an ANN that is trained on categorical data where there are multiple categories or labels but no intrinsic ordering to the data.

For example, certain foods such as red peppers are known to have high concentration of vitamin C. It may be an object of interest to distinguish between impedance data of various vitamin C levels so as to sort the red peppers by vitamin C concentration level. In order to achieve this goal the ANN could be trained on distinguishing between categories of different known concentration levels of vitamin C. The test data, consisting of red peppers of unknown vitamin C concentration, is then classified according to the concentration levels provided in the training.

In other embodiments; as discussed above, constituents in beer such as constituents that cause bitterness or other flavours in the beer may be of interest and the ANN may be trained to distinguish, classify and quantify constituents in the beer that may be correlated with specific desirable qualities of the beer, such as taste.

Yet other embodiments involving other MUT and other constituents fall within the present disclosure, in so far that the desired properties of the MUT may be determined through training the MLS on impedance spectroscopy data.

The MLS, such as the ANN, may also be trained on ordinal data whereby data is ordered (usually from smallest to largest). In the case of vitamin C, for example, the ANN would be trained on impedance data of various vitamin C levels of known concentrations provided in an ascending order. The test data consisting of red peppers of unknown vitamin C could then be classified according to vitamin C level (smallest to largest). Furthermore, the ANN may be trained to provide a prediction regarding the quantity of a constituent, such as vitamin C, in test data. Correspondingly, the ANN would be provided training data consisting of quantities of known vitamin C concentration levels.

Thus, more generally, the MLS, such as the ANN, may be trained to "recognize" or classify parameters by analysis of a measurement data set based on an iterative optimization process referred to as "training" on a data set whereby the parameters of interest are known. This type of machine learning may be capable of achieving a high degree of accuracy. For instance, in one test case conducted by the inventors, the ANN was used to predict the soluble solids content (SSC) of fruit from impedance data with an accuracy of ~90%. This is significant since the SSC of fruits consist of 80-85% sugar which is related to the overall fruit sweetness.

Training of the MLS, such as the ANN, according to one embodiment will be further discussed with reference to FIG. 3.

First training data 300 is fed through 310 into the ANN at 180. The training data may be categorical (e.g. different known concentration levels of constituents provided in no particular order), ordinal (e.g. different known concentration levels of constituents provided in a particular order ascending or descending) or quantitative (quantities of different known concentration levels of constituents). The results of the ANN are passed through link 360 into the classification prediction output at 380. The error between the true concentration levels of the training data and the ANN output are quantified in a cost function.

The magnitude of the cost function is then passed back to the ANN through 370 and the coefficients or weights of the neural network are adjusted so as to reduce this error.

In some embodiments, this can be accomplished through a gradient minimization technique. This process is continued iteratively until the cost function is reduced or converges to an acceptable level. At this point the ANN is considered trained on the supplied training data set. Test data in 350, consisting of impedance spectrum measurements of the MUT are then supplied to the trained ANN through 340. The output of the classification or prediction of the nutrient of interest level is then provided through 360 to the output at 380. As described earlier, depending on the nature of the training data, the ANN may categorize the MUT by constituent of interest concentration, provide a prediction of constituent of interest concentration or other prediction that it has been trained on.

In some embodiments, such as embodiments where the MUT is a foodstuff, including beverages, the system 100 may be used to classify or quantify levels of specific constituents, such as nutrients of interest, Nutrients of interest may include any nutrient that is related to the nutritional value of the food such as vitamins (A and C). However, other possible constituents or attributes of constituents may be of interests.

In some embodiments, the constituent of interest may be further correlated to another measure, which is ultimately of interest. For example, specific constituents in beer may be responsible for the bitterness of the beer, which is itself measured on an International Bittering Units (IBU) scale. As such, the impedance spectroscopy measurements and the system 100 may be used to predict the likely IBU rating of a beer based on the detection, classification and quantification of constituents in the beer under test.

For example, constituents of interest in beer may be alpha acids (related to IBU), diacetyl or alcohol. In known methods, a brewery has no straight forward manner of measuring these constituents and rely on ad hoc or periodic test of beer during production. This testing requires taking a sample of the beer being produced and performing chemical analysis in a laboratory to analyse the quantities and classification of the constituents, such as alpha acids, in the beer. Smaller breweries, such as microbreweries, may not have sufficient staff, expertise or equipment to perform known methods of analysis.

According to the present disclosure, such drawbacks may be alleviated, through real-time analysis, decrease of ingredient cost, increase in batch cycling and equipment ROI, early detection and quick correction of fermentation issues, and improvement of product consistency.

Figure 4:
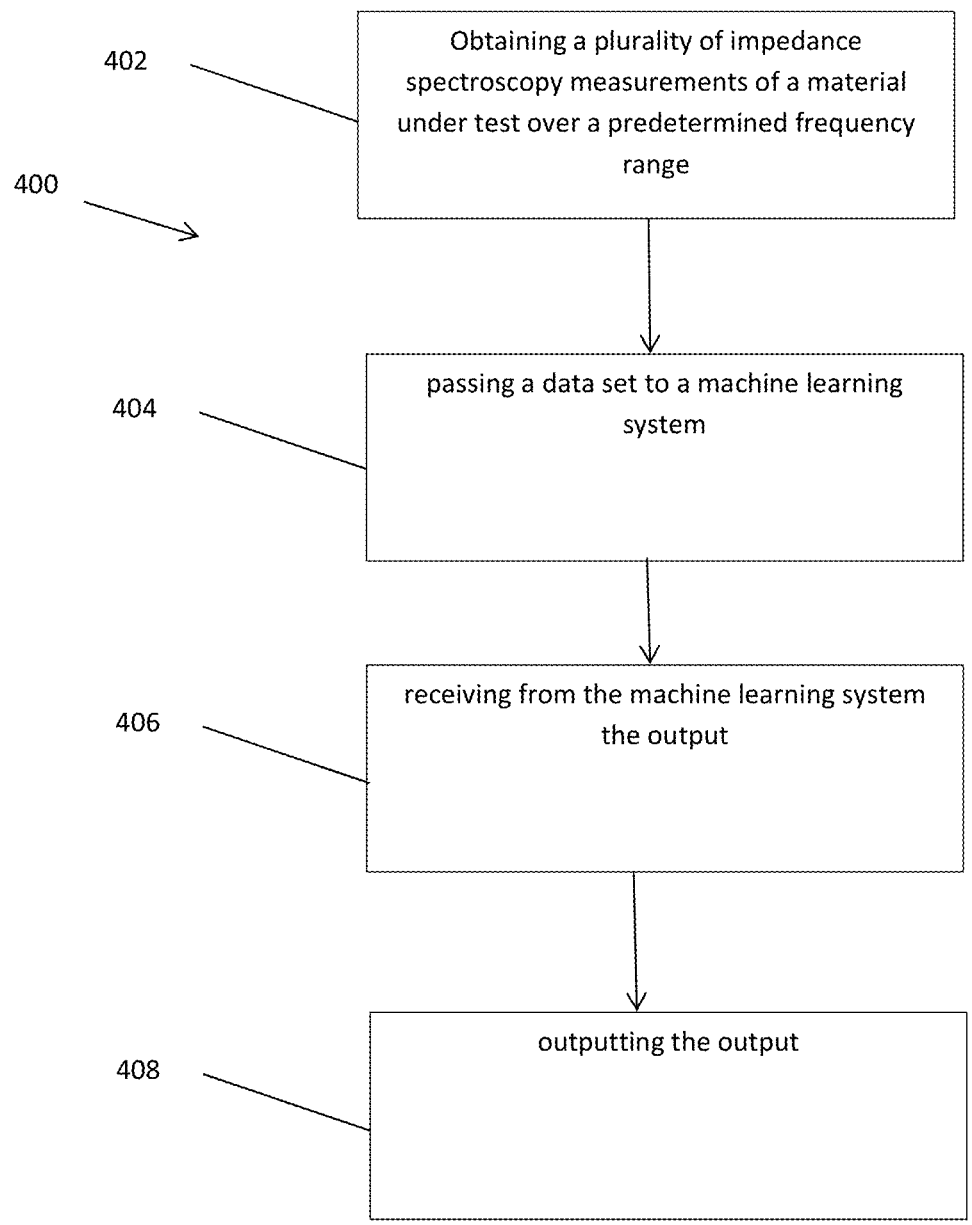
FIG. 4 is a block diagram showing steps in one embodiment of a method according to the present disclosure.

Accordingly, with reference to FIG. 4, in some embodiments of the present disclosure, there is provided a method 400 including: obtaining a plurality of impedance spectroscopy measurements of a material under test over a predetermined frequency range (402); passing a data set to a machine learning system, the machine learning system having been trained to return an output related to one or more constituents in the material under test based on impedance spectroscopy measurement data over the predetermined frequency range (404); receiving from the machine learning system the output (406); and outputting the output (408).

Some or all of the hardware elements and modules discussed above may be embodied in a device or measurement apparatus that passes the data as an input the ANN, which may be located in a separate location, such as on servers operating in the cloud, or which may be localized with the measurement apparatus, for example in the same physical device.

Figure 5:
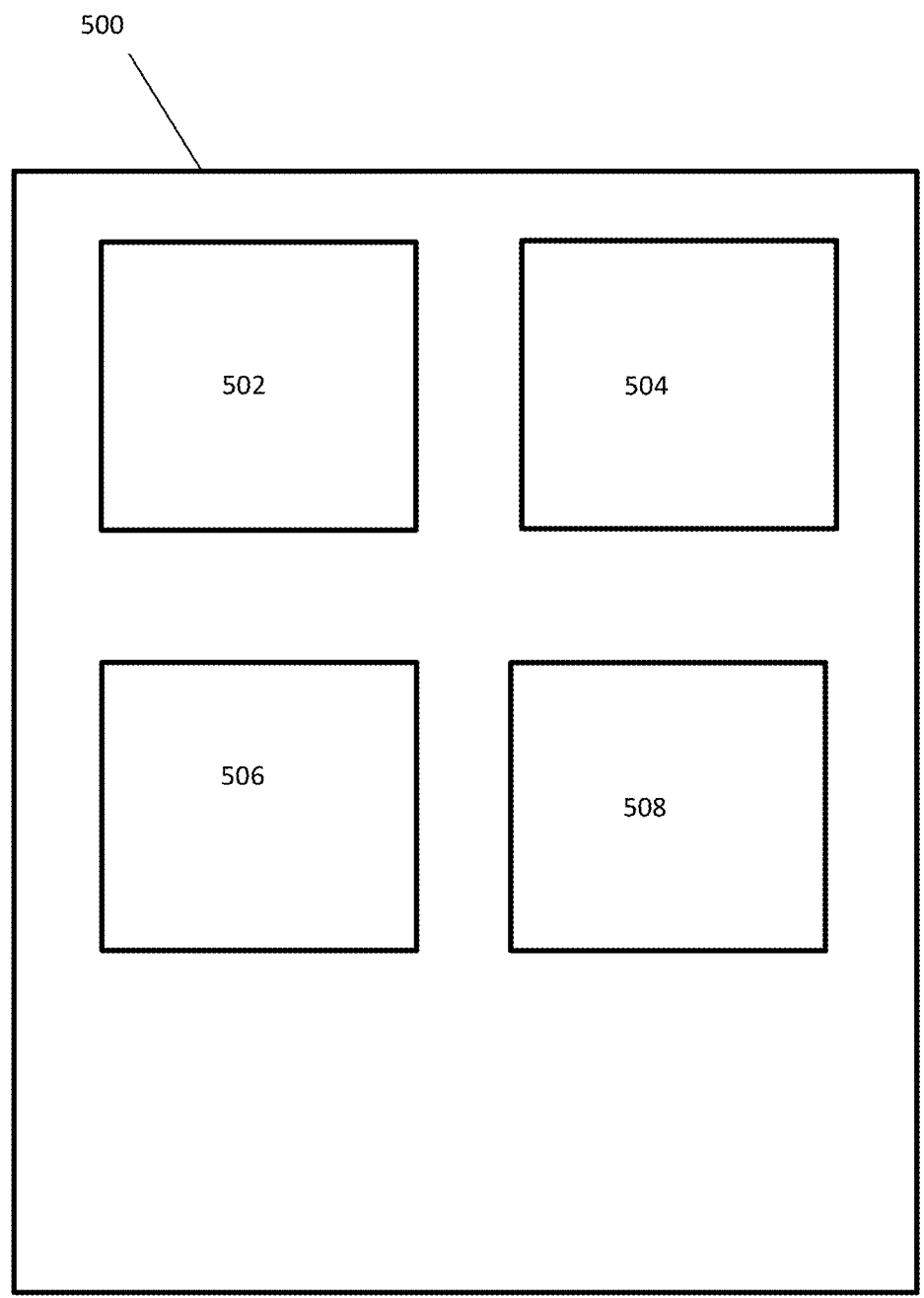
FIG. 5 is a block diagram showing one embodiment of a device according to the present disclosure.

With reference to FIG. 5, in some embodiments of the present disclosure, there is provided a device 500. The device includes a measurement module 502, an interface 504 and an output module 506.

The measurement module 502 is for operatively connecting to a pair of electrodes to obtain a plurality of impedance spectroscopy measurements of a material under test over a predetermined frequency range.

The interface 504 functions to i) pass a data set to a machine learning system, the machine learning system having been trained to return an output related to one or more constituents in the material under test based on impedance spectroscopy measurement data over the predetermined frequency range and ii) receive from the machine learning system the prediction of the attribute Finally, the output module functions to output the output received from the machine learning system, for example to a display 508, which may also form part of the device. If a display 508 is present, the device may also include software to display the output on the display 508 in a form intelligible to a user.

The measurement module 502 may comprise components of both the measurement board 135 described above as well as the processing unit 155 described above. For example, the measurement module 502 embodied in the device 500 may include a measurement board, similar to measurement board 135, as well as impedance spectrometer control software, such as the software 160 and a impedance data processing unit, such as the unit 170.

Due to the processing power requirements of an MLS, such as the ANN 180, the ANN 180 may be configured to be executed on a computer or server situated in a remote location. For example, the present disclosure includes embodiments where the ANN is executed in the cloud. Thus, the interface 504 may be configured to pass the data set, as would occur analogously at link 175, to the remote ANN 180. This may be accomplished over various known data links such as over a local or wide area network, such as the internet, either wired or wireless. In any case, the interface 504 may be configured to apply and use desired data transfer protocols to pass the data set to the ANN 180. It is also to be understood that the interface 504 may be configured to pass the data set to the ANN through an intermediary, such as a different computer or a mobile interface, such as a cell phone.

The systems, devices and methods of the present disclosure may be integrated into industrial processes for the production of the MUT; such as food stuff production. In this manner, the systems, devices and methods of the present disclosure may provide periodic and/or real-time feedback to the operators of the industrial process in order to aid control and adjustment of process parameters to ensure the analyzed constituents remain in tolerable or desirable quantities, concentrations, etc.

For example, in the production of a beverage such as beer, a device of the present disclosure; such as the device 500, may be attached to a fermentation vessel used during fermentation of the beer. The device may be operatively connected to probes, such as electrodes, inserted into the beer. The control software may be programmed to periodically conduct impedance spectroscopy sweeps of the beer with a predetermined frequency range and pass the data set based on the impedance spectroscopy measurements through a network, such as a LAN, to a computer, which either runs the ANN or further transmits the data set to a cloud computer or remote server that runs the ANN and returns the output, such as the alcohol content of the beer, to the device. As discussed above, in this example embodiment, the ANN would have been trained to detect concentrations or quantities of alcohol in the beer. The device may also pass the data set to the ANN directly through a telecommunications network. In that case, the interface 504 may operate as a mobile terminal that sends and receives data from a cellular network in order to connect with the ANN in a remote location.

Furthermore, based on the output, such as the alcohol content of the fermenting beer, one or more process parameters of the beer production process may be altered. For example, the temperature of the fermenting beer in the vessel may be controlled.

If the process parameters are themselves controlled automatically by appropriate software, methods, systems and devices according to the present disclosure may be configured to automatically pass the output of the ANN directly to the software controlling the process so that the process parameters are adjusted automatically, i.e. without human intervention, in response to the output. Accordingly, methods according to the present disclosure may include the step of adjusting a parameter of a process for producing the material under test based on the output from the device.

Figure 6:
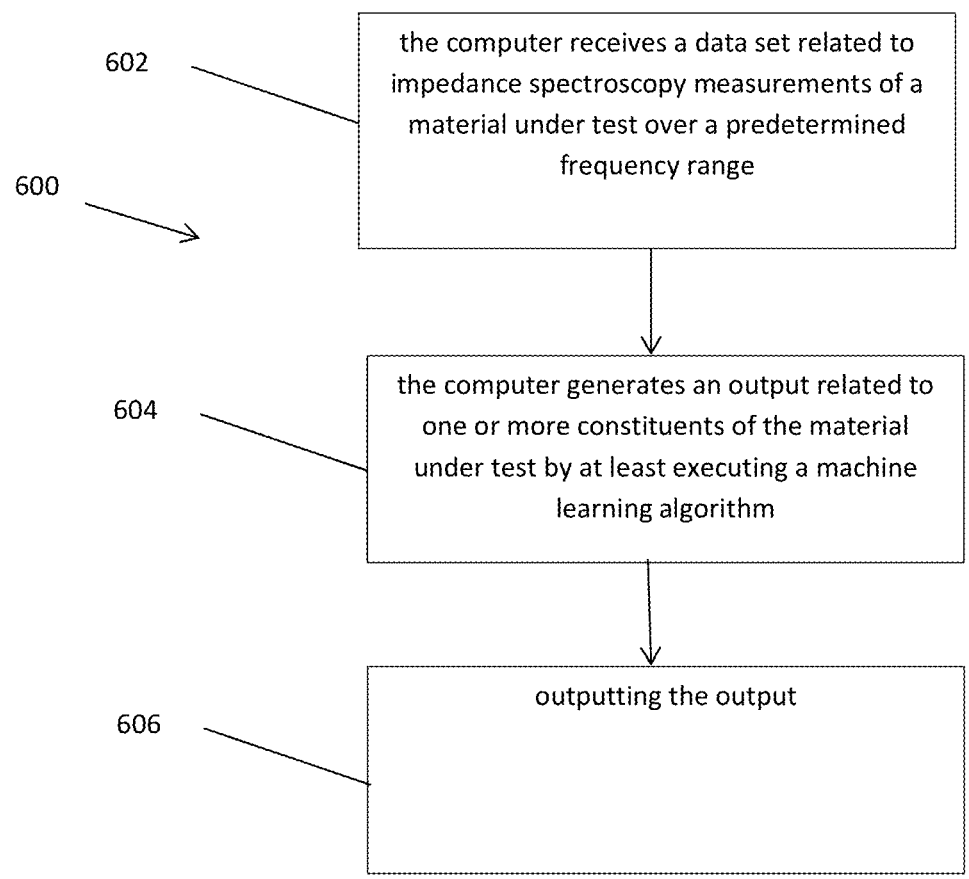
FIG. 6 is a block diagram showing steps in another embodiment of a method according to the present disclosure.

Referring now to FIG. 6, the present disclosure also provides for a computer-implemented method 600. At 602 the computer receives a data set related to impedance spectroscopy measurements of a material under test over a predetermined frequency range. At 604 the computer generates an output related to one or more constituents of the material under test by at least executing a machine learning algorithm, the machine learning algorithm having been trained to return the output based on data related to impedance spectroscopy measurements over the predetermined frequency range. At 606 the computer outputs the output.

In addition, although described primarily in the context of systems, devices and methods other implementations are also contemplated, as instructions stored on a non-transitory computer-readable medium, for example. Thus, any of the presently disclosed computer-implemented methods could be embodied as instructions on a non-transitory computer readable medium that, when executed by a processor or computer, cause the computer to perform one or more steps of the method.

The invention claimed is:

1. A method comprising:
obtaining a plurality of impedance spectroscopy measurements of a material under test over a predetermined frequency range;
passing an input data set to a machine learning system trained on a training data set to return an output related to one or more constituents in the material under test based on the input data set,
wherein the input data set comprises at least one of magnitude, phase, real and imaginary impedance components of the plurality of impedance spectroscopy measurements, and
the training data set comprises at least one of categorical data based on different known concentration levels of constituents provided in no particular order, ordinal data based on different known concentration levels of constituents provided in a particular order, and quantitative data based on quantities of different known concentration levels of constituents;
receiving from the machine learning system the output; and
outputting the output.

2. The method of claim 1, wherein the input data set comprises each of magnitude, phase, real and imaginary impedance components of the plurality of impedance spectroscopy measurements, and wherein the training data set comprises each of categorical data, ordinal data and quantitative data.

3. The method of claim 1, wherein the input data set further comprises pre-processed data based on the plurality of impedance spectroscopy measurements.

4. The method of claim 1, wherein each of the plurality of impedance spectroscopy measurements corresponds to a respective frequency point in the predetermined frequency range.

5. The method of claim 1, wherein the plurality of impedance spectroscopy measurements relate to a plurality of sweeps of the material under test.

6. The method of claim 1, wherein the machine learning system comprises an artificial neural network (ANN) having a plurality of nodes with an input layer, one or more hidden layers, and an output layer.

7. The method of claim 1, further comprising adjusting a parameter of a process for producing the material under test based on the output.

8. A device comprising:
a measurement module for operatively connecting to a pair of electrodes to obtain a plurality of impedance spectroscopy measurements of a material under test over a predetermined frequency range;
an interface configured to i) pass an input data set to a machine learning system,
wherein the input data set comprises at least one of magnitude, phase, real and imaginary impedance components of the plurality of impedance spectroscopy measurements, and
the machine learning system having been trained on a training data set to return an output related to one or more constituents in the material under test based on the data set, the training data set comprising at least one of categorical data based on different known concentration levels of constituents provided in no particular order, ordinal data based on different known concentration levels of constituents provided in a particular order, and quantitative data based on quantities of different known concentration levels of constituents,
and ii) receive from the machine learning system the output related to the one or more constituents;
an output module.

9. The device of claim 8, wherein the input data set comprises each of magnitude, phase, real and imaginary impedance components of the plurality of impedance spectroscopy measurements, and wherein the training data set comprises each of categorical data, ordinal data and quantitative data.

10. The device of claim 8, wherein the input data set further comprises pre-processed data based on the plurality of impedance spectroscopy measurements.

11. The device of claim 8, wherein the measurement model is configured to conduct a plurality of impedance spectroscopy measurements and wherein each measurement corresponds to a respective frequency point in the predetermined frequency range.

12. The device of claim 11, wherein the plurality of impedance spectroscopy measurements relate to a plurality of sweeps of the material under test.

13. A computer-implemented method comprising:
the computer receiving an input data set related to impedance spectroscopy measurements of a material under test over a predetermined frequency range;
the computer generating an output related to one or more constituents of the material under test by at least executing a machine learning algorithm trained on a training data set to return an output related to one or more constituents in the material under test based on the data set,
wherein the input data set comprises at least one of magnitude, phase, real and imaginary impedance components of the plurality of impedance spectroscopy measurements, and
the training data set comprises at least one of categorical data based on different known concentration levels of constituents provided in no particular order, ordinal data based on different known concentration levels of constituents provided in a particular order, and quantitative data based on quantities of different known concentration levels of constituents;
the computer outputting the output.

14. The method of claim 13, wherein the input data set comprises each of magnitude, phase, real and imaginary impedance components of the plurality of impedance spectroscopy measurements, and wherein the training data comprises each of categorical data, ordinal data and quantitative data.

15. The method of claim 13, wherein the data set comprises pre-processed data based on the plurality of impedance spectroscopy measurements.

16. The method of claim 13, wherein each of the plurality of impedance spectroscopy measurements corresponds to a respective frequency point in the predetermined frequency range.

17. The method of claim 13, wherein the plurality of impedance spectroscopy measurements relate to a plurality of sweeps of the material under test.

18. The method of claim 13, wherein the machine learning algorithm is executed in an artificial neural network (ANN) having a plurality of nodes.

19. The method of claim 18, wherein the nodes are arranged in layers, including one input layer, at least one intermediary, hidden layer, and an output layer.

\* \* \* \* \*